United States Patent Office 3,054,439
Patented Sept. 18, 1962

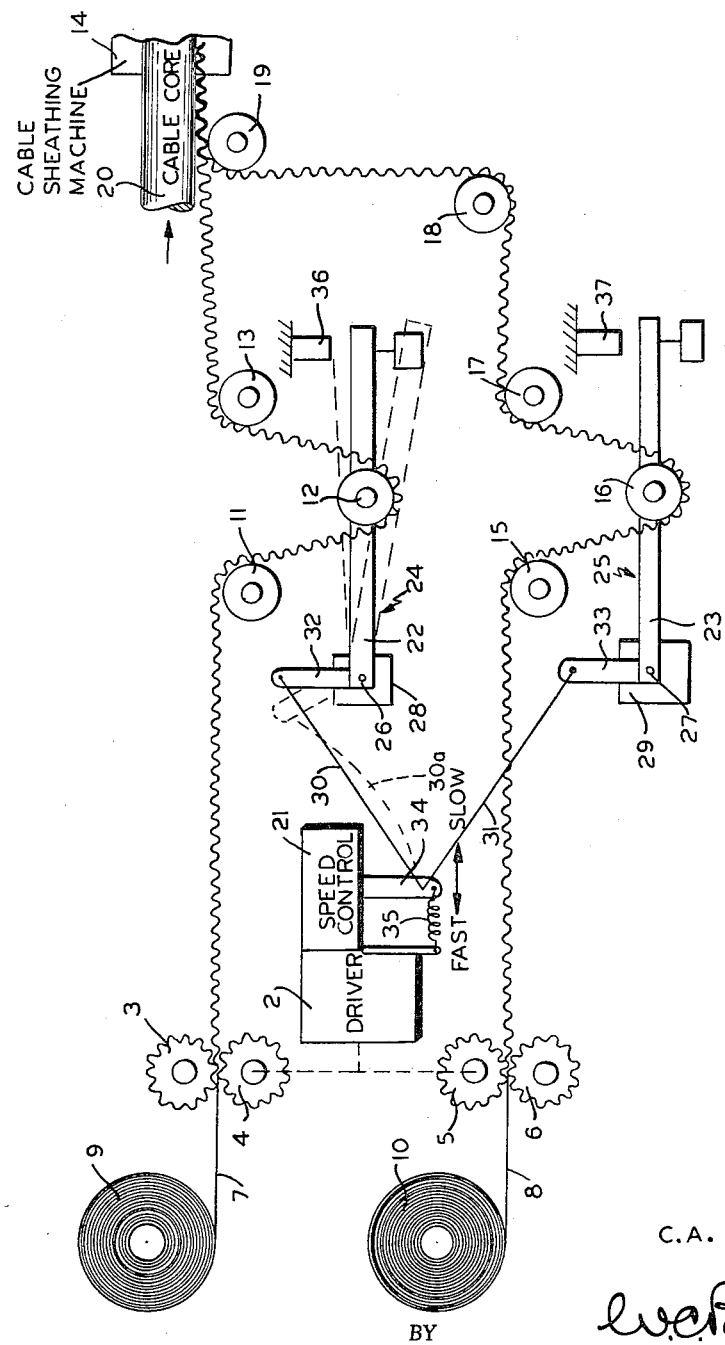

3,054,439
CORRUGATION AND MESHING OF
METAL TAPES
Cecil A. Hallam, Westfield, N.J., assignor to Western
Electric Company, Incorporated, New York, N.Y., a
corporation of New York
Filed Nov. 19, 1958, Ser. No. 775,079
4 Claims. (Cl. 153—77)

This invention relates to the corrugation and registration of tapes, and particularly to apparatus for producing lateral corrugations in a pair of advancing metal tapes and for positioning the tapes in meshing relation with each other.

An application for the present invention is found in the fabrication of composite metal sheathings for cables of the type disclosed in Patent 2,589,700 to H. G. Johnstone, wherein flat laterally corrugated aluminum and steel tapes are combined in meshing relation and formed around an advancing cable core with the edges of the steel tape meeting in a longitudinal overlapping seam which is subsequently soldered. Due to the different physical properties of the two tapes, it is not possible to produce and maintain exactly the same spacing between corrugations in the two tapes. When the difference in spacing is extremely small the tapes may be forced or held in mesh. However, in practice, due to the variations in hardness and thickness of the two tapes, as well as unequal wear in the forming rolls, the difference in spacing between corrugations of the two tapes becomes sufficiently large that they cannot be held in mesh in the sheathing apparatus. Consequently, in order that the tapes may be properly meshed, as required for producing a smooth continuous seam in the outer steel tape when it is formed over the aluminum tape around the cable core, it is first necessary to stretch the tape having the greater number of corrugations per unit length so that its corrugations will mesh with the corrugations of the other tape.

Applicant's co-pending application, Serial No. 670,669, filed July 9, 1957, (now Patent No. 2,916,072) discloses one system which has been used successfully in the cable industry for corrugating and meshing tapes used for fabricating such sheathings. This system utilizes individually driven forming means for producing the corrugations in each of the tapes and the required stretching of the one tape is produced through interaction between rolls having spaced teeth engaging the corrugations of each tape.

The object of this invention is an improved, simple, and reliable system for corrugating and meshing a pair of tapes.

In the present invention a single common driver is used for rotating the forming rolls for corrugating the two tapes. The laterally corrugated tapes pass through respective slack takeup loops and thereafter are guided into overlaying or superimposed relation on an advancing article such as a cable core. At the start, the superimposed tapes are placed in meshing relation, and thereafter, the system keeps them meshed. The speed control for the driver is responsive to movable elements in the takeup loops such that only the larger of the two takeup loops, that is, the one formed by the tape having the greater spacings between corrugations, controls the speed. Thus, the larger loop always controls the speed, increasing and decreasing it, depending on whether the loop size is increasing or decreasing, and the smaller loop has no effect at all either in increasing or decreasing the speed. Means are provided for preventing a reduction in the size of each of the loops below a predetermined minimum size so that when the corrugations in one of the tapes are spaced closer together than those of the other tape, since the speed of the driver is regulated by the movable control element in the takeup loop for the other tape, the size of its takeup loop will decrease progressively until the minimum loop size is reached, after which the required stretch will be introduced into the tape of that reduced loop.

These and other features of the invention will be fully understood from the following detailed description, when taken in conjunction with the single FIGURE of the accompanying drawing showing a schematic diagram of a system for corrugating and meshing a pair of tapes for a composite sheathing for a cable as described above.

In the system shown in the drawing, a common driver 2 rotates forming rolls 3, 4 and 5, 6 at identical speeds to form corrugations in two metal tapes 7 and 8 supplied from rolls 9 and 10 respectively. These tapes may be the aluminum and steel tapes respectively as used in the aforementioned composite sheathing for the cable. The rolls 3, 4, 5 and 6 all have the same number of forming teeth and while two pairs of forming rolls have been shown, it is possible to utilize a single pair, in which case the tapes 7 and 8 would be corrugated simultaneously. From the output of the forming rolls the tape 7 passes over pulleys 11, 12 and 13 of a slack takeup loop and then into overlaying relation with tape 8 at the entrance end of a cable sheathing machine 14 wherein the tapes are formed around the advancing cable core 20. Similarly, from the output of the forming rolls 5 and 6, tape 8 passes over pulleys 15, 16 and 17 of another slack takeup loop and then over idler pulleys 18 and 19 under tape 7. The tapes are pulled along by the cable core 20 advancing in the direction of the arrow since the tapes are formed around the cable core and secured thereto. In starting, the steel tape 8 is first threaded between roll 19 and the cable core 20, and then the aluminum tape 7 is laid on top of the steel tape on roll 19 in a meshing relation. The pressure of the cable core against the tapes will thereafter hold the tapes in mesh as seen in the drawing.

The speed of the forming roll driver 2 is controlled by a speed control unit 21 which, in turn, is controlled by the size of the two takeup loops. Pulley 12 in the upper loop and pulley 16 in the lower loop are both movably mounted on horizontally disposed elements 22 and 23 of L-shaped members 24 and 25 respectively. The members 24 and 25 are pivotally mounted by pins 26 and 27 to fixed support members 28 and 29 respectively and the free ends of elements 22 and 23 are weighted to exert a positive downward force on the tapes so that the slack in each of the lines will be taken up by the loops. Fixed stop members 36 and 37 are provided for engaging elements 22 and 23 of the pivoted members in order to limit the minimum size of the tapeup loops, that is, the pulleys 12 and 16 may be moved upwardly only until the elements 22 and 23 run into the respective stops 36 and 37.

One end of each of the cables 30 and 31 is connected to the ends of vertical elements 32 and 33 of members 24 and 25 respectively, and the other ends of the cables are connected together on a lever 34 for regulating the speed control 21 for driver 2. The cable may be of any flexible, unstretchable material. The lever 34 is biased in a direction to increase the speed of driver 2 by means of a spring 35. With this cable control the speed of the driver is controlled by the larger or longer of the takeup loops, that is, the one having the tape with the lesser number of corrugations per unit length, which would result in one of the corresponding elements 22 or 23 occupying a position correspondingly lower than the other. The cable 30 or 31 for the larger of the two loops will be taut, holding the speed control lever back while the other cable will become slack. The smaller takeup loop will decrease progressively until its element 22 or 23 engages stop 36 or 37 respectively. In the case for the tape 7 being corrugated at closer intervals than the tape 8, the cable 30 will become slack (30a) and the element 22 will raise until it hits stop 36. Thereafter the corrugated tape 7 will be stretched, due to the pull of the moving cable 20 on the tape, and the insufficiency in length of the tape 7 between the output of corrugating rolls 3, 4 and the roll 19. When the tapes are brought together at pulley 19, they will be held in mesh and while in meshing relation enter the sheathing machine and be formed transversely around the cable core. While the stretching of the one tape so that its corrugations will be in registration with the corrugations of the other will not permanently deform the one to the exact length of the other, since the system is a dynamic one and the tapes are formed around the advancing cable core before the tension thereon is released, the tapes in their formed tubular shape will remain in registration.

In the event of variations in speed of the advancing cable core, the above described control arrangement for the driver will make corresponding changes in the speed of the driver. For example, when the cable core is speeded up, the larger of the two takeup loops will decrease in size and its cable 30 or 31 will relax allowing the spring 35 to pull the control lever 34 in a direction to increase the speed of the driver 2. Conversely, when the speed of the cable core is reduced, the larger of the two takeup loops will increase in size, thereby pulling the lever 34 in the direction to slow down the driver 2.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A system for corrugating and meshing two metal tapes comprising forming rolls for producing lateral corrugations in the tapes and for advancing the tapes, a common driver for the rolls, a speed control for the driver, means for producing a slack takeup loop in each of the tapes at the output of the forming rolls, means for limiting the minimum size of each loop, means for regulating the speed control responsive to the variations in the size of both loops when equal in size and responsive to the variations in size of the larger of the two loops when unequal in size, means at the output of the two loops for holding the tapes in meshing relation and for advancing the tapes, and while the larger loop regulates the speed control the means at the output of the two loops stretches the tape with the smaller loop so that the tape with the smaller loop is of required span for the proper meshing of the two tapes.

2. A system for corrugating and meshing two metal tapes comprising forming rolls for producing lateral corrugations in the tapes and advancing the tapes, a common driver for the rolls, a speed control for the driver, a movable tape engaging element for producing a slack takeup loop in each of the tapes at the output of the forming rolls, means for preventing a reduction in the size of each loop below a predetermined minimum size, means for actuating the speed control responsive to the location of both movable elements when the spacing between successive corrugations on both tapes is equal or, when not equal responsive to the location of the movable element having the tape with the larger spacing between successive corrugations, means at the output of the two loops for holding the tapes in meshing relation and for advancing the tapes, and while the speed control is responsive to the location of the movable element having the tape with the larger spaces between successive corrugations the means at the output of the two loops pulls the other tape so as to increase the spaces between successive corrugations of the other tape for the proper meshing of the two tapes.

3. A system according to claim 2 in which the means for actuating the speed control comprises an actuator on the speed control, spring biasing means for the actuator for exerting a force thereon tending to increase the speed of the driver, a pair of flexible, relatively unstretchable elements connected to the actuator, and means for each loop, responsive to movement of the respective movable loop elements thereof, connected to respective ones of the flexible elements for pulling the speed control actuator in a direction opposing the bias thereon when the respective loops are increased in size and for allowing the bias to return the actuator to increase the speed of the driver when the loops are reduced in size.

4. A system according to claim 2 in which each of the movable loop elements comprises pulleys rotatably mounted on horizontally disposed weighted members with vertical extensions thereon connected to respective ones of the flexible elements.

References Cited in the file of this patent
UNITED STATES PATENTS

| | | |
|---|---|---|
| 2,327,689 | Wyrick | Aug. 24, 1943 |
| 2,586,286 | Andreas | Feb. 19, 1952 |
| 2,661,525 | Edwards | Dec. 8, 1953 |